United States Patent
Zhang et al.

(10) Patent No.: US 11,446,647 B2
(45) Date of Patent: Sep. 20, 2022

(54) METHOD FOR MANUFACTURING PHOTOCATALYTIC FILTER HAVING POROUS NANOFIBER HETEROSTRUCTURE

(71) Applicant: SOUTHEAST UNIVERSITY, Nanjing (CN)

(72) Inventors: Xiaoyang Zhang, Nanjing (CN); Tong Zhang, Nanjing (CN); Shanjiang Wang, Nanjing (CN); Yu Ji, Nanjing (CN); Minghu Zhao, Nanjing (CN); Linfeng Zhao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 280 days.

(21) Appl. No.: 16/771,298

(22) PCT Filed: May 28, 2018

(86) PCT No.: PCT/CN2018/088742
§ 371 (c)(1),
(2) Date: Jun. 10, 2020

(87) PCT Pub. No.: WO2019/114200
PCT Pub. Date: Jun. 20, 2019

(65) Prior Publication Data
US 2020/0391193 A1 Dec. 17, 2020

(30) Foreign Application Priority Data
Dec. 12, 2017 (CN) .......................... 201711315595.X

(51) Int. Cl.
| | | |
|---|---|---|
| *B01J 31/16* | (2006.01) | |
| *B01J 31/38* | (2006.01) | |
| *B01J 31/26* | (2006.01) | |
| *B01D 53/86* | (2006.01) | |
| *B01D 39/14* | (2006.01) | |
| *B01J 35/00* | (2006.01) | |
| *B01J 35/06* | (2006.01) | |
| *B01J 37/04* | (2006.01) | |
| *B01J 37/06* | (2006.01) | |
| *B01J 37/34* | (2006.01) | |
| *B01J 27/04* | (2006.01) | |
| *B01J 21/06* | (2006.01) | |
| *B01J 23/06* | (2006.01) | |
| *B01D 39/16* | (2006.01) | |
| *B01J 35/02* | (2006.01) | |
| *B01J 23/50* | (2006.01) | |
| *B01J 23/66* | (2006.01) | |
| *B01J 37/00* | (2006.01) | |

(52) U.S. Cl.
CPC .......... *B01J 31/1683* (2013.01); *B01D 39/14* (2013.01); *B01D 39/1623* (2013.01); *B01D 53/8687* (2013.01); *B01J 21/063* (2013.01); *B01J 23/06* (2013.01); *B01J 23/50* (2013.01); *B01J 23/66* (2013.01); *B01J 27/04* (2013.01); *B01J 31/1608* (2013.01); *B01J 31/26* (2013.01); *B01J 31/38* (2013.01); *B01J 35/004* (2013.01); *B01J 35/0013* (2013.01); *B01J 35/0033* (2013.01); *B01J 35/026* (2013.01); *B01J 35/065* (2013.01); *B01J 37/009* (2013.01); *B01J 37/04* (2013.01); *B01J 37/06* (2013.01); *B01J 37/342* (2013.01); *B01D 2239/025* (2013.01); *B01D 2239/0414* (2013.01); *B01D 2239/0631* (2013.01); *B01D 2239/10* (2013.01); *B01D 2255/104* (2013.01); *B01D 2255/106* (2013.01); *B01D 2255/1021* (2013.01); *B01D 2255/20792* (2013.01); *B01D 2255/802* (2013.01); *B01D 2255/9155* (2013.01); *B01J 2231/005* (2013.01); *B01J 2531/004* (2013.01); *B01J 2531/17* (2013.01); *B01J 2531/18* (2013.01)

(58) Field of Classification Search
CPC .. B01D 39/1623; B01D 39/14; B01J 31/1683; B01J 35/026; B01J 35/004; B01J 35/065; B01J 37/04; B01J 37/009; B01J 23/50; B01J 23/66; B01J 27/04
See application file for complete search history.

(56) References Cited

FOREIGN PATENT DOCUMENTS

CN 107051451 * 8/2017 .............. B01J 23/68

* cited by examiner

Primary Examiner — Yong L Chu
(74) Attorney, Agent, or Firm — CBM Patent Consulting, LLC

(57) ABSTRACT

A method for preparing a porous nano-fiber heterostructure photocatalytic filter screen includes: preparing a noble metal nanostructure with tunable spectra and a heterostructure composite photocatalyst of a photocatalytic material; and preparing a large area and multilayer porous nano-fiber filter screen structure, while utilizing a scattering enhancement effect of metal nanoparticles in an porous optical fiber to realize repeated conduction of sunlight in the optical fiber and finally interact with the composite photocatalyst on a surface to improve photocatalytic efficiency. Preparation of the heterostructure composite photocatalyst with a wide spectral response of and tunable visible to infrared band spectra is realized, at the same time, with reference to high adsorbability, high light transmission of nanometer fiber and unique optical characteristics of metal nanoparticles, an air purification filter screen with a high sunlight utilization rate and a high catalytic degradation capability is creatively provided.

9 Claims, 2 Drawing Sheets

METHOD FOR MANUFACTURING PHOTOCATALYTIC FILTER HAVING POROUS NANOFIBER HETEROSTRUCTURE

TECHNICAL FIELD

The present invention relates to the fields of nanomaterials, photocatalysis and thin film devices, and in particular to a porous nano-fiber heterostructure photocatalysis filter screen based on a hot electron mechanism and a method for preparing the same.

BACKGROUND

Nowadays, air pollution is becoming increasingly serious. It is generally believed that air purification by utilizing photocatalytic performance of a semiconductor metal oxide is greatly promising. Traditional photocatalytic materials, such as titanium dioxide, zinc oxide and other materials, have attracted extensive attention due to their advantages of high chemical stability, environmental friendliness, simple processes and low costs.

However, application scenarios of photocatalytic air purification is limited due to the following numerous defects: extremely low photocatalytic quantum efficiency (usually about 1%) brought by recombination of photo-generated electron holes, a relatively large band gap, which may correspond to only light in an ultraviolet band (only 4% of a solar spectrum), inability to utilize sunlight in visible to even infrared band cannot be used, poor compatibility with a traditional filter screen structure, and the like. Therefore, it is a hot research direction for researchers to seek a new mechanism and multifunctional composite photocatalytic air purification filter screen structure.

In order to realize effective separation of photo-generated electron hole pairs and a wide solar spectral response that can be extended to visible to even infrared bands, surface modification of the semiconductor metal oxide by utilizing plasmonic metal nanostructures is one of effective mans. When a size of a metal nanostructure is reduced to a nano scale, it will exhibit unique optical characteristic-surface plasmon effect. Surface plasmon refers to surface wave resonance generated by free electrons driven by a light field when an incident light irradiates a metal surface. The localized photon-electron resonance can be tuned by a morphology, a size and material characteristics of the surface plasmonic structure, and an absorption peak with a tunable visible to infrared band peak value is reflected in the spectrum. Surface plasmons on metal nanostructures generate high-energy electrons in non-radiative transitions, which are called "hot electrons". Therefore, such high-energy electrons have sufficient energy, so that a barrier between plasmonic metal nanostructures and semiconductor nanomaterials can be overcome (i.e., "schottky barrier"), and the electrons are injected into the semiconductor nanomaterials rapidly, and finally participate in photochemical reactions. The hot electron transport mechanism induced based on a surface plasmon effect will effectively realize separation of the photo-generated electron-hole pair, thereby greatly improving photocatalytic quantum efficiency of catalytic materials.

A traditional photocatalytic filter material is usually composed of cotton-based filter material, a filter screen of an aluminum-nickel-based material, non-woven filter screen, and the like. Such materials have many problems in terms of the adsorption capacity, air permeability and a cost volume. Therefore, it is an urgent problem to seek a filter screen structure that can be prepared with a large area and that has high light transmittance, high air permeability and high adsorption capacity. Introduction of an electrospinning technology effectively solves such problems. Electrospinning is a special fiber manufacturing process, in which a polymer solution or a melt is usually jet spun in a strong electric field. Under the effect of an electric field, a droplet at a needle will change from spherical to conical, i.e. Taylor cone, and extend from the tip of the cone to obtain fiber filaments. Using a polymer spinning solution, polymer filaments of nano-size diameters can be produced through the electrospinning technology. Such polymer filaments have conducting characteristics similar to those of "optical fiber" and can change vertically incident light into light conducting along the "optical fiber" by constructing a scattering center of metal particles. At the same time, by adjusting relevant spinning parameters, functional modification of the "optical fiber" surface can be realized, and a filter screen with high specific surface area, high adsorbability and high light transmittance can be realized, thereby meeting different practical application requirements.

A porous nano-fiber heterostructure photocatalysis filter screen based on a hot electron mechanism and a method for preparing the same are provided to solve problems such as low catalytic efficiency of the photocatalytic material, insufficient utilization of sunlight, low capability of adsorbing organic pollutants by the filter screen, a short service life of the purification system, high costs and the like in a purification system consisting of a photocatalytic material and a filter screen in a traditional air purification system, and the photocatalysis filter screen is expected to replace the filter screen purification system in the traditional air purifier to realize a new generation of high-efficiency, low-cost and high-life air purifier.

SUMMARY

Technical Problems

The present invention aims to provide a method for preparing a porous nano-fiber heterostructure photocatalysis filter screen based on a hot electron mechanism to solve problems of low catalytic efficiency of photocatalytic materials, insufficient utilization of sunlight, low capability of adsorbing organic pollutants by a filter screen, short service life of a purification system, high costs and the like in the traditional air purifier. Such filter screen structure can realize a wide spectral line response of sunlight band, high catalytic capability and multilevel and full utilization of sunlight, and realize broad-spectrum and high-efficiency air purification.

Technical Solutions

To solve the technical problems, a porous nano-fiber heterostructure photocatalysis filter screen based on a hot electron mechanism and a method for preparing the same is provided, comprising the following steps:

Step I: Preparing a Photocatalytic Heterostructure Consisting of an Plasmonic Metal Nanostructure with Tunable Visible to Infrared Band Spectra and a Semiconductor Nanostructure:

centrifuging an plasmonic metal nanostructure solution with the tunable visible to infrared band spectra for 1-5 times at a centrifugal speed of 300-10000 rpm/min, removing a capping agent on a surface of the solution, and preparing an initial solution a with a concentration of 0.1-20 mol/L; centrifuging a semiconductor nanostructure solution for 1-5 times at a centrifugal speed of 1000-20000 rpm/min, removing a capping agent on a surface of the solution to redisperse in deionized water, and preparing an initial solution a with a concentration of 0.1-10 mol/L; dissolving surface ligand molecules in the deionized water to prepare an initial solution c with a concentration of 0.2-20 mol/L; mixing the initial solution b and the initial solution and fully stirring them, so that the surface ligand molecules are fully absorbed on a surface of a photocatalytic material, centrifuging for 1-5 times at a centrifugal speed of 1000-10000 rpm/min, removing excessive surface ligand molecules, and redispersing in the deionized water to obtain a mixed solution d;

mixing the initial solution a and the mixed solution d and fully stirring them, ensuring that plasmonic metal nanostructures with tunable spectra in the mixed solution d and the initial solution a are fully absorbed, and finally forming a heterostructure solution e consisting of the plasmonic metal nanostructures with tunable spectra and the semiconductor nanostructure that are randomly combined.

Step II: Preparing an Electrospinning Solution dissolving the solution e taken from step I, a high molecular organic polymer, and an amphiphilic polymer organic polymer in a mono-component or multicomponent organic solvent, stirring at a room temperature until a colorless transparent solution f with a mass fraction of a high molecular organic polymer of 6%-20% is obtained, adding a large-size metal nanoparticle solution with a molar concentration of 0.0001-1 mol/L, and continuously stirring until a colorless transparent solution is obtained to obtain the electrospinning solution g.

Step III: Preparing a Porous, Large-Area Filter Screen taking the electrospinning solution g into a glass syringe, removing bubbles therein, loading the solution on an injection card slot of an electrospinning device, and cutting an aluminum foil to cover a receiving roller; turning on a power supply of the electrospinning device and set basic parameters, where a rotating speed of the receiving roller is 10-1000 rpm/min, a syringe needle is 5-20 cm away from the roller, a positive high voltage is set to 5-30 kv, a negative high voltage is set to 1-3 kv, an injection speed is set to 0.1-3 ml/h, and a spinning time is 0.01-24 hours, turning off the power supply after spinning is finished, taking off the aluminum foil and placing it in a vacuum drying oven for vacuum drying to obtain a composite polymer fiber structure; in order to obtain a porous polymer fiber structure, soaking the aluminum foil loaded with fiber in the deionized water for 0.1-48 hours, dissolving the amphiphilic polymer organic polymer in the deionized water by utilizing two-phase compatibility characteristic of the amphiphilic polymer organic polymer and the water-insoluble characteristic of the polymer organic polymer, taking out the aluminum foil, heating and drying it in the air to finally obtain an air purification filter screen structure with a diameter of 100-10 μm, a length of 10-10000 μm and a porosity of 1-99%.

A material of the plasmonic metal nanostructure is selectable from gold, silver or platinum, or a multicomponent alloy material consisting of the above materials, a shape is a triangular plate, a cube or a rod shape, and the plasmonic metal nanostructure is the nanostructure with the tunable visible to infrared band spectra has a size of 10 nanometers to 2000 nanometers.

Materials of the surface ligand molecules are selectable from surface ligand molecules, such as dimercapto-polyethylene glycol, polyethylene glycol or 3-aminopropyltriethoxysilane, having high surface affinity with the plasmonic metal nanostructure.

A material of the semiconductor nanostructure is selectable from a nano-size oxide or sulfide semiconductor nanostructure, such as titanium dioxide $TiO_2$, zinc oxide ZnO, cadmium sulfide CdS or ferric oxide $Fe_2O_3$, or a heterostructure consisting of plasmonic metal nano-structures such as gold, silver or palladium, and the nano-size oxide or sulfide semiconductor material, or a multicomponent composite heterostructure forming by compounding the above structures. The nano-size oxide or sulfide semiconductor nano-structure has a spherical, rod-shaped, triangular or cubic shape with a size of 10 nanometers to 100 nanometers, and a metal material has a spherical, rod-shaped, triangular or cubic shape with a size of 5 nanometers to 1000 nanometers.

A material of the high molecular organic polymer is selectable from polystyrene PS PI or polyacrylonitrile PAN.

A material of the high molecular organic polymer is selectable from a two-phase polymer material that can be dissolved in both a water phase and an oil phase, such as polyvinyl pyrrolidone PVP, cetyltrimethylammonium bromide CTAB or sodium dodecyl sulfate SDS.

A material of the multicomponent solvent is selectable from a mono-component solvent such as cyclopentanone, dimethylformamide, ethanol, ethylene glycol or toluene, or a mixture of multicomponent solvents that consist of the mono-component solvent and that has high and low boiling points.

A material of the large-size metal nanoparticle solution is selectable from the plasmonic metal nanostructure with remarkable light scattering enhancement characteristics and with a spherical, rod-shaped, triangular or cubic shape, such as gold, silver or platinum, or from a mixture of the shape with a size of 50 nanometers to 10000 nanometers.

Principles of the present invention are as follows: when sunlight or light from other artificial light sources is vertically incident on a surface of a porous nano-fiber heterostructure photocatalytic filter screen, part of the light is absorbed by a heterostructure consisting of the plasmonic metal nanostructure embedded on a porous nano-fiber surface and the semiconductor nanostructure; based on its surface plasmon resonance effect, a metal nanostructure surface produces high-energy electron (i.e., "hot electron"). The hot electron has high enough energy to cross a schottky barrier between plasmonic metal nanostructures and semiconductor nanomaterials, and inject into the photocatalytic materials rapidly, leaving holes on a metal surface. Electrons in a conduction band of photocatalytic materials participate in a reduction reaction of oxygen, and holes left on the metal surface participate in an oxidation reaction of organic pollutants, thus realizing primary catalytic degradation of air pollutants. At the same time, large-size metal particles wrapped inside the porous nano-fiber and the heterostructure which is not in contact with outside air are used as scattering centers to improve a wave vector of another part of unabsorbed visible light and realize wave vector matching with mode light in the porous nano-fiber, so that the part of vertically incident visible light becomes conductive light which can be conducted in the porous nano-fiber for many times. The conducted light is absorbed again by the heterostructure consisting of the plasmonic metal nanostructure embedded on the porous nano-fiber surface and the semiconductor nanostructure, thus realizing multilevel and full utilization of light while realizing secondary catalytic degradation.

Beneficial Effects

Compared with the prior art, the present invention has the following advantages:

1. At present, photocatalytic purification materials available in the market are mainly nano-$TiO_2$. Due to its own band gap limitation (only excited by light in ultraviolet band) of the material, high recombination probability of photo-generated electron hole pairs (low photocatalytic efficiency) and few photocatalytic active sites, further application of this material is greatly limited. Based on this, we propose a heterostructure consisting of an plasmonic metal nanostructure with tunable visible to infrared band spectra and a semiconductor nanostructure to realize efficient catalytic degradation of organic pollutants in the air. Based on the plasmonic effect of metal nanostructures, by properly adjusting a size of the metal nanostructures, wide band in visible to even infrared band can be excited. At the same time, based on the hot electron mechanism induced by the plasmonic effect, the hot electron with higher energy can overcome the schottky barrier and be injected into the adjacent semiconductor nanostructures rapidly, thus greatly reducing the probability of recombination of electron hole pairs and effectively improving quantum efficiency of photocatalytic materials. In addition, the high specific surface area and multiple reactive sites of the structure greatly improve catalytic capability of the photocatalytic materials.

2. In order to realize processes of adsorption, filtration, purification, and the like of polluted air, the traditional air purification filter screen is often realized by adopting a multilayer filter membrane structure, and each layer of filter membrane only embodies a single function. This greatly increases the volume and costs of the filter screen structure. Based on this, we propose a porous nano-fiber filter screen structure that can embed catalytic materials on a nano-fiber surface. An amphiphilic polymer material is dissolved in deionized water by utilizing two-phase compatibility characteristics of the amphiphilic polymer materials and characteristics of different evaporation speeds of multicomponent organic solvents, so that more catalytic materials are exposed to air and embedded on a porous nano-fiber surface, a porous structure is realized on the originally smooth fiber surface and at the same time, the catalytic materials are effectively and fully contacted with the air. The porous fiber filter screen structure not only effectively fixes catalytic materials and ensures full contact with the air, but also greatly increases the photocatalytic specific surface area. Finally, in combination with excellent characteristics of the fiber material such as high light transmission, strong adsorption, low costs, small volume and the like, we can realize multifunctional air purification by only using a single-layer filter screen structure and complete efficient degradation of air pollutants.

3. To solve problems of low utilization rates of incident light and an inability to reuse light energy in traditional filter screens, we propose a porous nano-fiber doped with large-size metal nanoparticles. Metal particles wrapped in the porous nano-fiber serve as scattering centers to increase the wave vector of light vertically incident on the porous nano-fiber so as to match with a wave vector of mode light in the porous fiber, and realize repeated conduction of light in the porous fiber. Therefore, previously unused incident light is repeatedly conducted on the heterostructure consisting of the metal embedded on the porous nano-fiber surface and the photocatalytic materials to excite the catalytic reaction. This realizes multilevel and full utilization of light and significantly improves the utilization rate of light.

Figure 1:
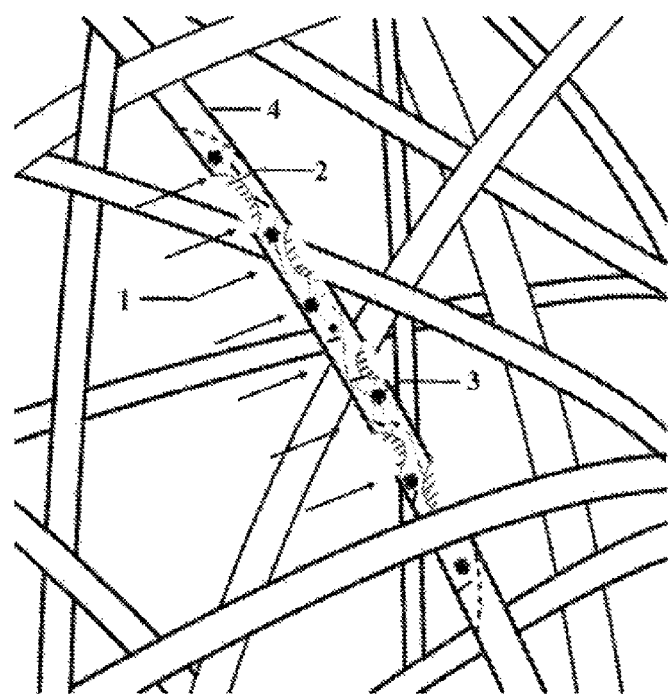
FIG. 1 shows a schematic diagram of an overall structure of a filter screen.
Figure 2:
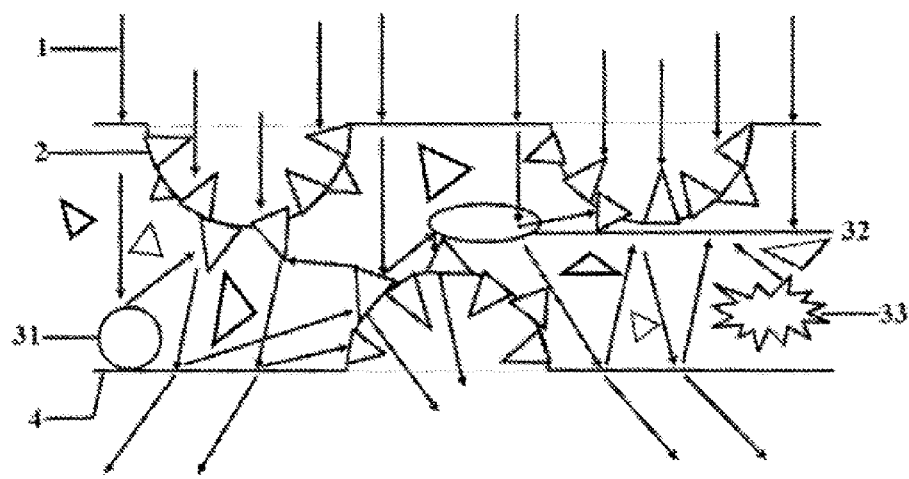
FIG. 2 shows a schematic diagram of a local basic structure of a filter screen and a diagram of a sunlight propagation path.

In the figure, there are sunlight 1, a heterostructure 2 consisting of a plasmonic metal nanostructure and a semiconductor nanostructure, a cadmium sulfide nanoball 21, a gold nanocube 22, a surface ligand molecule 23, a silver nanoball 24, a titanium dioxide nanorod 25, a silver triangle plate 26, a zinc oxide nanostar 27, a silver nanorod shell 28, a gold nanorod core 29, a large-size metal nanoparticle 3, a spherical metal nanoparticle 31, an ellipsoidal metal nanoparticle 32, a star-shaped metal nanoparticle 33, and porous polymer optical fiber 4.

DETAILED DESCRIPTION

The present invention is further described through the detailed description below:

Embodiment 1

Figure 3:
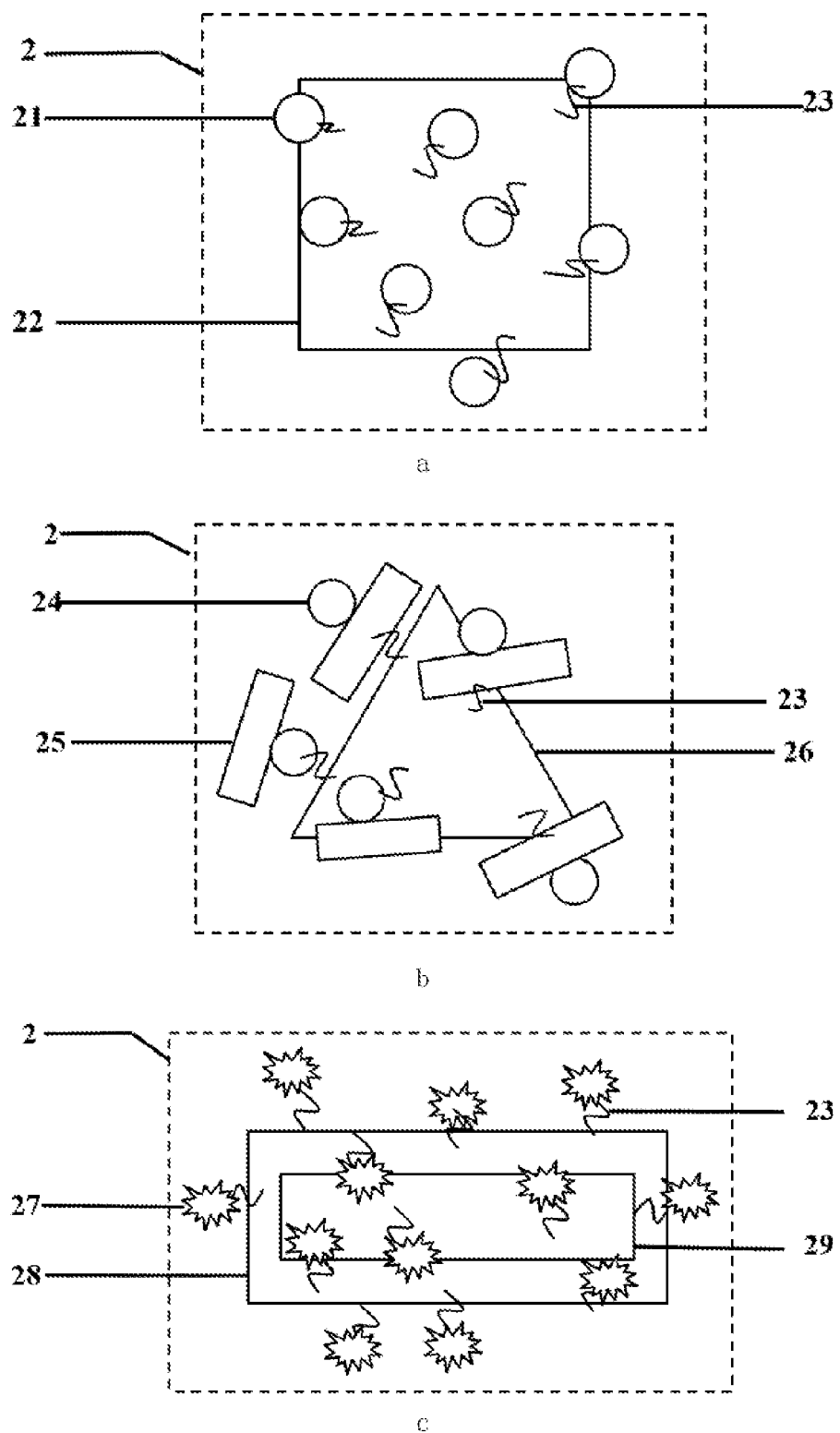
FIG. 3 is a schematic diagram of a heterostructure consisting of a titanium dioxide nanorod a, a silver triangle b, and a silver nanoball c.

Step I: Prepare a Photocatalytic Heterostructure Consisting of an Plasmonic Metal Nanostructure with Tunable Visible to Infrared Band Spectra and a Semiconductor centrifuge a gold nanocube with tunable visible to infrared band spectra 3 times at 4500 rpm for 15 min, with precipitate dissolved in deionized water to prepare an initial solution a with a concentration of 0.1 mol/L; centrifuge a cadmium sulfide nanoball solution 5 times at 10000 rpm for 20 min, with precipitate dissolved in deionized water to prepare an initial solution b with a concentration of 3 mol/L; dissolve polyethylene glycol molecules into the deionized water to prepare an initial solution c with a concentration of 6 mol/L; take 20 ml from each of the initial solution b and the initial solution c for mixing, fully stir them and then centrifuge 3 times at 5000 rpm for 15 min, with precipitate dissolved in deionized water to obtain a mixed solution d with a concentration of 3 mol/L;

take 10 ml from each of the initial solution a and the initial solution d for mixing, fully stir them and finally form a heterostructure solution e consisting of gold nanocube and the cadmium sulfide nanoball (as shown in FIG. 3a).

Step II: Prepare an Electrospinning Solution dissolve 2 ml of the solution e, 2 g of polyimide and 0.3 g of cetyltrimethylammonium bromide CTAB in 10 ml of cyclopentanone, stir at a room temperature until a colorless transparent solution f with a mass fraction of polyimide of 13% is obtained, add 1 ml of a gold nanotriangle solution with a concentration of 0.1 mol/L and a size of 60 nm, and continuously stir to colorless and transparent to obtain an electrospinning solution g.

Step III: Prepare a Porous, Large-Area Filter Screen take 5 ml of the electrospinning solution g into a glass syringe with a volume of 10 ml, load the solution on an injection card slot of an electrospinning device, and cut an aluminum foil to cover a receiving roller; turn on a power supply of the electrospinning device and set basic parameters, where a rotating speed of the receiving roller is 100 rpm/min, a syringe needle is 20 cm away from the roller, a positive high voltage is set to 25 kv, a negative high voltage is set to 1.5 kv, an injection speed is set to 0.5 ml/h; maintain the above parameters for 2 h, turn off the power supply after spinning is finished, take off the aluminum foil and place it in a vacuum drying oven for vacuum drying at 60° C. for 1 h; to obtain a porous polymer fiber structure, soak the aluminum foil loaded with fiber in the deionized water for 1 h, so as to dissolve cetyltrimethylammonium bromide CTAB in the porous polymer fiber to obtain the porous polymer fiber structure; take out the aluminum foil, dry it in the air at 80° C. for 1 h to obtain a final air purification filter screen structure.

Embodiment 2

Step I: Prepare a Photocatalytic Heterostructure Consisting of an Plasmonic Metal Nanostructure with Tunable Visible to Infrared Band Spectra and a Semiconductor centrifuge a silver triangle solution with tunable visible to infrared band spectra 2 times at 6000 rpm for 25 min, with precipitate dissolved in deionized water to prepare an initial solution a with a concentration of 0.5 mol/L; centrifuge a heterostructure solution consisting of the titanium dioxide nanorod and the silver nanoball 3 times at 8000 rpm for 10 min, with precipitate dissolved in deionized water to prepare an initial solution b with a concentration of 1 mol/L; dissolve dimercapto-polyethylene glycol molecules into the deionized water to prepare an initial solution c with a concentration of 1 mol/L; take 20 ml from each of the initial solution b and the initial solution c for mixing, fully stir them and then centrifuge 3 times at 6000 rpm for 15 min, with precipitate dissolved in deionized water to obtain a mixed solution d with a concentration of 1 mol/L;

take 10 ml from each of the initial solution a and the initial solution d for mixing, fully stir them and finally form a heterostructure solution e consisting of a silver triangle, the titanium dioxide nanorod, and the silver nanoball (as shown in FIG. 3b).

Step II: Prepare an Electrospinning Solution dissolve 1 ml of the solution e, 3 g of polystyrene and 1 g of polyvinyl pyrrolidone PVP in 30 ml of binary mixed solvent of cyclopentanone and dimethylformamide (a volume ratio of 1:1), stir at a room temperature until a colorless transparent solution f with a mass fraction of polystyrene of 7% is obtained, add 0.5 ml of a silver nanoball solution with a concentration of 0.01 mol/L and a size of 100 nm, and continuously stir to colorless and transparent to obtain an electrospinning solution g.

Step III: Prepare a Porous, Large-Area Filter Screen take 5 ml of the electrospinning solution g into a glass syringe with a volume of 10 ml, load the solution on an injection card slot of an electrospinning device, and cut an aluminum foil to cover a receiving roller; turn on a power supply of the electrospinning device and set basic parameters, where a rotating speed of the receiving roller is 400 rpm/min, a syringe needle is 15 cm away from the roller, a positive high voltage is set to 15 kv, a negative high voltage is set to 2 kv, an injection speed is set to 1 ml/h; maintain the above parameters for 1 h, turn off the power supply after spinning is finished, take off the aluminum foil and place it in a vacuum drying oven for vacuum drying at 60° C. for 1 h; to obtain a porous polymer fiber structure, soak the aluminum foil loaded with fiber in the deionized water for 1 h, so as to dissolve polyvinyl pyrrolidone PVP in the porous polymer fiber to obtain the porous polymer fiber structure; take out the aluminum foil, dry it in the air at 80° C. for 1 h to obtain a final air purification filter screen structure.

Embodiment 3

Step I: Prepare a Photocatalytic Heterostructure Consisting of an Plasmonic Metal Nanostructure with Tunable Visible to Infrared Band Spectra and a Semiconductor centrifuge a gold and silver alloy nanorod solution with tunable visible to infrared band spectra 3 times at 8000 rpm for 15 min, with precipitate dissolved in deionized water to prepare an initial solution a with a concentration of 2 mol/L; centrifuge a zinc oxide nanostar solution 2 times at 10000 rpm for 5 min, with precipitate dissolved in deionized water to prepare an initial solution b with a concentration of 5 mol/L; dissolve 3-aminopropyltriethoxy silicon into the deionized water to prepare an initial solution c with a concentration of 8 mol/L; take 20 ml from each of the initial solution b and the initial solution c for mixing, fully stir them and then centrifuge 3 times at 3000 rpm for 10 min, with precipitate dissolved in deionized water to obtain a mixed solution d with a concentration of 5 mol/L;

take 10 ml from each of the initial solution a and the initial solution d for mixing, fully stir them and finally form a heterostructure solution e consisting of a gold and silver alloy nanorod and a zinc oxide nanostar (as shown in FIG. 3c).

Step II: Prepare an Electrospinning Solution dissolve 3 ml of the solution e, 5 g of polyacrylonitrile and 1.5 g of sodium dodecyl sulfate SDS in 45 ml of ternary mixed solvent of ethylene glycol, toluene and dimethylformamide (a volume ratio of 1:1:1), stir at a room temperature until a colorless transparent solution f with a mass fraction of polyacrylonitrile of 10% is obtained, add 4 ml of a silver nanowire solution with a concentration of 0.05 mol/L and a size of 1000 nm, and continuously stir to colorless and transparent to obtain an electrospinning solution g.

Step III: Prepare a Porous, Large-Area Filter Screen take 8 ml of the electrospinning solution g into a glass syringe with a volume of 10 ml, load the solution on an injection card slot of an electrospinning device, and cut an aluminum foil to cover a receiving roller; turn on a power supply of the electrospinning device and set basic parameters, where a rotating speed of the receiving roller is 800 rpm/min, a syringe needle is 5 cm away from the roller, a positive high voltage is set to 10 kv, a negative high voltage is set to 3 kv, an injection speed is set to 2 ml/h; maintain the above parameters for 0.5 h, turn off the power supply after spinning is finished, take off the aluminum foil and place it in a vacuum drying oven for vacuum drying at 60° C. for 1 h; to obtain a porous polymer fiber structure, soak the aluminum foil loaded with fiber in the deionized water for 1 h, so as to dissolve sodium dodecyl sulfate SDS in the porous polymer fiber to obtain the porous polymer fiber structure; take out the aluminum foil, dry it in the air at 80° C. for 1 h to obtain a final air purification filter screen structure.

What is claimed is:

1. A method for preparing a porous nano-fiber heterostructure photocatalytic filter screen, wherein the method comprises the following steps:
    step I: preparing a photocatalytic heterostructure consisting of a plasmonic metal nanostructure with tunable visible to infrared band spectra and a semiconductor nanostructure,
    1-1) centrifuging a solution containing the plasmonic metal nanostructure with the tunable visible to infrared band spectra, removing a capping agent on a surface of the solution, and preparing an initial solution a with a concentration of 0.1-20 mol/L of the plasmonic metal nanostructure;
    1-2) centrifuging a semiconductor nanostructure solution, removing a capping agent on a surface of the solution to redisperse in deionized water, and preparing an initial solution b with a concentration of 0.1-10 mol/L of the semiconductor nanostructure;

1-3) dissolving surface ligand molecules in deionized water to prepare an initial solution c with a concentration of 0.2-20 mol/L of the surface ligand molecules;

1-4) mixing the initial solution b and the initial solution c and fully stirring them, wherein the surface ligand molecules are absorbed on a surface of a photocatalytic material, centrifuging, removing excessive surface ligand molecules, and redispersing in the deionized water to obtain a mixed solution d;

1-5) mixing the initial solution a and the mixed solution d and fully stirring them, ensuring that plasmonic metal nanostructures with tunable spectra in the mixed solution d and the initial solution a are fully absorbed, and finally forming a heterostructure solution e consisting of the plasmonic metal nanostructures with tunable spectra and semiconductor nanostructures that are randomly combined;

step II: preparing an electrospinning solution dissolving the heterostructure solution e, a high molecular organic polymer, and an amphiphilic polymer organic polymer in a mono-component or multicomponent organic solvent, stirring at a room temperature to obtain a colorless transparent solution f with 6%-20% the high molecular organic polymer by mass, adding a large-size metal nanoparticle solution with a molar concentration of 0.0001-1 mol/L, and continuously stirring to obtain the electrospinning solution g that is colorless transparent;

step III: preparing a porous, large-area filter screen taking the electrospinning solution g into a glass syringe, removing bubbles therein, loading the electrospinning solution g on an injection card slot of an electrospinning device, and cutting an aluminum foil to cover a receiving roller; turning on a power supply of the electrospinning device and set basic parameters, wherein a rotating speed of the receiving roller is 10-1000 rpm/min, a syringe needle is 5-20 cm away from the roller, a positive high voltage is set to 5-30 kv, a negative high voltage is set to 1-3 kv, an injection speed is set to 0.1-3 ml/h, and a spinning time is 0.01-24 hours, turning off the power supply after spinning is finished, taking off the aluminum foil and drying in a vacuum drying oven to obtain a composite polymer fiber structure;

soaking the aluminum foil loaded with fiber in the deionized water for 0.1-48 hours, dissolving the amphiphilic polymer organic polymer in the deionized water, taking out the aluminum foil, heating and air-drying to obtain an air purification filter screen structure with a diameter of 10-100 μm, a length of 10-10000 μm and a porosity of 1-99%.

2. The method for preparing the porous nano-fiber heterostructure photocatalytic filter screen according to claim 1, wherein the plasmonic metal nanostructure is made from gold, silver, platinum, or a multicomponent alloy material consisting of gold, silver and platinum; wherein the plasmonic metal nanostructure has a triangular plate, cube or rod shape, and the plasmonic metal nanostructure is a nanostructure with tunable visible to infrared band spectra having a size of 10 nanometers to 2000 nanometers.

3. The method for preparing the porous nano-fiber heterostructure photocatalytic filter screen according to claim 1, wherein the surface ligand molecules have high surface affinity with the plasmonic metal nanostructure, and are selected from the group consisting of dimercapto-polyethylene glycols, polyethylene glycols and 3-aminopropyltriethoxysilanes.

4. The method for preparing the porous nano-fiber heterostructure photocatalytic filter screen according to claim 1, wherein the semiconductor nanostructure is made from a nano-size oxide or sulfide semiconductor nano-structure selected from the group consisting of titanium dioxide $TiO_2$, zinc oxide ZnO, cadmium sulfide CdS, and ferric oxide $Fe_2O_3$; or the semiconductor nanostructure is made from a heterostructure, wherein the heterostructure consisting of gold, silver and palladium.

5. The method for preparing the porous nano-fiber heterostructure photocatalytic filter screen according to claim 4, wherein the nano-size oxide or the sulfide semiconductor nano-structure has a spherical, rod-shaped, triangular or cubic shape with a size of 10 nanometers to 100 nanometers, and the heterostructure has a spherical, rod-shaped, triangular or cubic shape with a size of 5 nanometers to 1000 nanometers.

6. The method for preparing the porous nano-fiber heterostructure photocatalytic filter screen according to claim 1, wherein the high molecular organic polymer is made from polystyrene PS, polyimide PI or polyacrylonitrile PAN.

7. The method for preparing the porous nano-fiber heterostructure photocatalytic filter screen according to claim 1, wherein the high molecular organic polymer is made from a two-phase polymer material that dissolves in both a water phase and an oil phase; and the high molecular organic polymer is selected from the group consisting of polyvinyl pyrrolidone PVP, cetyltrimethylammonium bromide CTAB and sodium dodecyl sulfate SDS.

8. The method for preparing the porous nano-fiber heterostructure photocatalytic filter screen according to claim 1, wherein the multicomponent solvent comprising a mono-component solvent selected from the group consisting of cyclopentanone, dimethylformamide, ethanol, ethylene glycol and toluene; or a mixture thereof.

9. The method for preparing the porous nano-fiber heterostructure photocatalytic filter screen according to claim 1, wherein the plasmonic metal nanostructure in the large-size metal nanoparticle solution is made from gold, silver or platinum; the plasmonic metal nanostructure has light scattering enhancement characteristics and forms shape of spherical, rod, triangular, or cubic, or a mixture of shapes with a size of 50 nanometers to 10000 nanometers.

* * * * *